(12) United States Patent
Shah

(10) Patent No.: US 11,987,208 B2
(45) Date of Patent: May 21, 2024

(54) UWB MODULE AUTO LOCATION IN VEHICLE

(71) Applicants: DENSO International America, Inc., Southfield, MI (US); DENSO CORPORATION, Kariya (JP)

(72) Inventor: Tirthesh Shah, Canton, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 331 days.

(21) Appl. No.: 17/479,566

(22) Filed: Sep. 20, 2021

(65) Prior Publication Data

US 2022/0289141 A1    Sep. 15, 2022

Related U.S. Application Data

(60) Provisional application No. 63/160,999, filed on Mar. 15, 2021.

(51) Int. Cl.
| | | |
|---|---|---|
| B60R 25/01 | (2013.01) | |
| B60R 16/023 | (2006.01) | |
| B60R 25/24 | (2013.01) | |

(52) U.S. Cl.
CPC .......... B60R 25/241 (2013.01); B60R 16/023 (2013.01); B60R 25/01 (2013.01); *B60R 2325/10* (2013.01)

(58) Field of Classification Search
CPC ..... B60R 25/241; B60R 16/023; B60R 25/01; B60R 2325/10; B60R 25/24; B60R 2325/101; B60R 2325/103; B60R 2325/105
See application file for complete search history.

(56) References Cited

U.S. PATENT DOCUMENTS

| | | |
|---|---|---|
| 8,930,045 B2 | 1/2015 | Oman et al. |
| 9,688,247 B1 | 6/2017 | Jayaraman et al. |
| 9,794,753 B1 | 10/2017 | Stitt et al. |
| 9,894,492 B1 | 2/2018 | Elangovan et al. |
| 10,002,479 B2 | 6/2018 | Oz et al. |
| 10,244,476 B2 | 3/2019 | Elangovan et al. |
| 10,328,898 B2 | 6/2019 | Golsch et al. |

(Continued)

FOREIGN PATENT DOCUMENTS

| | | |
|---|---|---|
| BR | 102014017465 A2 | 2/2016 |
| CN | 104574593 A | 4/2015 |

(Continued)

*Primary Examiner* — Jacob M Amick
(74) *Attorney, Agent, or Firm* — Harness, Dickey & Pierce, P.L.C.

(57) ABSTRACT

Systems and method are provided and include ultra-wide band (UWB) modules located within a vehicle at module locations that are located at known distances relative to each other. The UWB modules perform UWB distance ranging with a portable device and with each other. A control module instructs each UWB module to perform distance ranging with every other UWB module of the plurality of UWB modules, receives a set of measurements associated with each UWB module, performs a comparison of the measurements with the known distances, and determines locations for each UWB module based on the comparison, the locations being one of the plurality of module locations.

18 Claims, 7 Drawing Sheets

(56) References Cited

U.S. PATENT DOCUMENTS

| | | | |
|---|---|---|---|
| 10,328,899 B2 | 6/2019 | Golsch | |
| 10,328,900 B1 | 6/2019 | Yakovenko et al. | |
| 10,926,738 B1 | 2/2021 | Tucci et al. | |
| 2011/0215921 A1 | 9/2011 | Ben Ayed et al. | |
| 2012/0045058 A1 | 2/2012 | Weghaus | |
| 2014/0274013 A1 | 9/2014 | Santavicca | |
| 2015/0148989 A1 | 5/2015 | Cooper et al. | |
| 2015/0161832 A1 | 6/2015 | Esselink et al. | |
| 2015/0310681 A1 | 10/2015 | Avery et al. | |
| 2015/0356797 A1 | 12/2015 | McBride et al. | |
| 2016/0150407 A1 | 5/2016 | Michaud et al. | |
| 2017/0062938 A1 | 3/2017 | Cheng et al. | |
| 2017/0104589 A1 | 4/2017 | Lambert et al. | |
| 2017/0132533 A1 | 5/2017 | Darnell et al. | |
| 2017/0309098 A1 | 10/2017 | Watters et al. | |
| 2017/0330402 A1 | 11/2017 | Menard et al. | |
| 2018/0029560 A1 | 2/2018 | Mohaupt et al. | |
| 2018/0099643 A1 | 4/2018 | Golsch et al. | |
| 2018/0103414 A1 | 4/2018 | Golsch | |
| 2018/0126952 A1 | 5/2018 | Niemiec | |
| 2018/0154865 A1 | 6/2018 | Bianchi, III et al. | |
| 2018/0269565 A1 | 9/2018 | Guthrie et al. | |
| 2022/0035017 A1* | 2/2022 | Ette | G01S 13/56 |

FOREIGN PATENT DOCUMENTS

| | | |
|---|---|---|
| FR | 2911712 A1 | 7/2008 |
| WO | WO-16156682 A1 | 10/2016 |
| WO | WO-2017181050 A1 | 10/2017 |
| WO | WO-18040641 A1 | 3/2018 |
| WO | WO-2019149399 A1 | 8/2019 |

\* cited by examiner $d_{x,y}$ = distance measured by UWB module X to UWB module Y $d_{x,y}$ = distance measured by UWB module X to UWB module Y

UWB MODULE AUTO LOCATION IN VEHICLE

CROSS-REFERENCE TO RELATED APPLICATIONS

This application claims the benefit of U.S. Provisional Application No. 63/160,999, filed on Mar. 15, 2021. The entire disclosure of the above application is incorporated herein by reference.

FIELD

The present disclosure relates to systems and methods for automatically locating ultra-wide band modules in vehicles.

BACKGROUND

This section provides background information related to the present disclosure which is not necessarily prior art.

A passive entry/passive start (PEPS) system for a vehicle may utilize a number of ultra-wide band (UWB) modules positioned at known locations in and around a vehicle. The UWB modules can perform distance ranging with a portable device, such as a smartphone or key fob, associated with the vehicle and report the measured distances from each of the UWB modules to the portable device to a PEPS system control module that determines the location of the portable device relative to the vehicle based on the measured distances and the known locations of the UWB modules in and around the vehicle. Based on the location of the portable device relative to the vehicle, the PEPS system can authorize certain vehicle functions, such as unlocking the vehicle, opening a trunk of the vehicle, starting the vehicle, etc.

In order to mistake proof the installation of the UWB modules in and around the vehicle, traditional systems utilize UWB modules that have different physical characteristics from each other. For example, a set of UWB modules may use connector keying whereby the UWB modules may have different physical connectors for different locations within the vehicle. For example, the UWB modules may include a 4 or 6 pin connector and the pins within the connector for the UWB modules may be differently arranged depending on the designated locations for the UWB modules within the vehicle. For further example, the configuration of the pins of the connector for the UWB module located at the front driver side of the vehicle is different from configuration of the pins of the connector for the UWB module located at other locations, such as a rear passenger side of the vehicle. In this way, at the time of installation a UWB module designated for the front driver side cannot physically be installed at a different location, such as the rear passenger side. As such, the physical configuration of the pins within the connectors ensures that the UWB modules are installed at the proper locations within and around the vehicle.

Utilizing different physical characteristics for different UWB modules in the vehicle, however, requires increased manufacturing costs for producing multiple different UWB modules with physical differences. In addition, each of the physically different UWB modules must undergo the part number approval process. Requiring different physical configurations and different part numbers for each UWB module to be utilized in a vehicle adds costs and requires additional time and resources for part approval.

SUMMARY

This section provides a general summary of the disclosure, and is not a comprehensive disclosure of its full scope or all of its features.

A system is provided and includes a plurality of ultra-wide band (UWB) modules located within a vehicle having a plurality of module locations, the plurality of module locations being located at known distances relative to each other, each UWB module being configured to perform UWB distance ranging with a portable device and with every other UWB module of the plurality of UWB modules. The system also includes a control module in communication with the plurality of UWB modules and having a processor and memory configured to: store the known distances of the plurality of module locations relative to each other; instruct each UWB module of the plurality of UWB modules to perform distance ranging with every other UWB module of the plurality of UWB modules; receive a set of measurements associated with each UWB module of the plurality of UWB modules, the set of measurements including distances measured by the associated UWB module to every other UWB module of the plurality of UWB modules; perform a comparison of the set of measurements associated with each UWB module with the known distances of the plurality of UWB modules relative to each other; and determine a location within the vehicle of each UWB module of the plurality of UWB modules based on the comparison, the location for each UWB module being one of the plurality of module locations.

In other features, the control module is further configured to assign a unique network address to each UWB module of the plurality of UWB modules.

In other features, the control module is further configured to store, for each UWB module of the plurality of UWB modules, the determined location of the UWB module along with the unique network address assigned to the UWB module.

In other features, each UWB module includes a unique identifier and the control module is further configured to store, for each UWB module of the plurality of UWB modules, the unique identifier of the UWB module along with the determined location and unique network address assigned to the UWB module.

In other features, the control module is further configured to: instruct each UWB module of the plurality of UWB modules to perform distance ranging with the portable device; receive a set of distance measurements from the plurality of UWB modules, the set of distance measurements indicating distances from each UWB module of the plurality of UWB modules to the portable device; and determine a location of the portable device relative to the vehicle based on the set of distance measurements and based on the determined location of each UWB module within the vehicle.

In other features, the control module is further configured to authorize at least one vehicle function of the vehicle based on the determined location of the portable device relative to the vehicle, the at least one vehicle function including at least one of unlocking the vehicle, opening a trunk of the vehicle, and starting the vehicle.

In other features, the control module is in communication with a passive entry passive start system configured to authorize at least one vehicle function of the vehicle based on the determined location of the portable device relative to the vehicle, the at least one vehicle function including at least one of unlocking the vehicle, opening a trunk of the vehicle, and starting the vehicle.

In other features, the control module is configured to communicate with each UWB module of the plurality of UWB modules via at least one wired bus communication connection.

A method of locating a plurality of ultra-wide band (UWB) modules located within a vehicle having a plurality of module locations is also provided. The plurality of module locations are located at known distances relative to each other, and each UWB module is configured to perform UWB distance ranging with a portable device and with every other UWB module of the plurality of UWB modules. The method includes: storing, with a control module, the known distances of the plurality module locations relative to each other; instructing, with the control module, each UWB module of the plurality of UWB modules to perform distance ranging with every other UWB module of the plurality of UWB modules; receiving, with the control module, a set of measurements associated with each UWB module of the plurality of UWB modules, the set of measurements including distances measured by the associated USB module to every other UWB module of the plurality of UWB modules; performing, with the control module, a comparison of the set of measurements associated with each UWB module with the known distances of the plurality of UWB modules relative to each other; and determining, with the control module, a location within the vehicle of each UWB module of the plurality of UWB modules based on the comparison, the location for each UWB module being one of the plurality of module locations.

In other features, the method further includes assigning, with the control module, a unique network address to each UWB module of the plurality of UWB modules.

In other features, the method further includes storing, with the control module and for each UWB module of the plurality of UWB modules, the determined location of the UWB module along with the unique network address assigned to the UWB module.

In other features, each UWB module includes a unique identifier, the method further comprising storing, for each UWB module of the plurality of UWB modules, the unique identifier of the UWB module along with the determined location and unique network address assigned to the UWB module.

In other features, the method further includes: instructing, with the control module, each UWB module of the plurality of UWB modules to perform distance ranging with the portable device; receiving, with the control module, a set of distance measurements from the plurality of UWB modules, the set of distance measurements indicating distances from each UWB module of the plurality of UWB modules to the portable device; and determining, with the control module, a location of the portable device relative to the vehicle based on the set of distance measurements and based on the determined location of each UWB module within the vehicle.

In other features, the method further includes authorizing, with the control module, at least one vehicle function of the vehicle based on the determined location of the portable device relative to the vehicle, the at least one vehicle function including at least one of unlocking the vehicle, opening a trunk of the vehicle, and starting the vehicle.

In other features, the method further includes communicating, with the control module, the determined location of the portable device to a passive entry passive start system configured to authorize at least one vehicle function of the vehicle based on the determined location of the portable device relative to the vehicle, the at least one vehicle function including at least one of unlocking the vehicle, opening a trunk of the vehicle, and starting the vehicle.

In other features, the method further includes communicating, between the control module and each UWB module of the plurality of UWB modules, via at least one wired bus communication connection.

Another system is also provided and includes a plurality of ultra-wide band (UWB) modules located within a vehicle having a plurality of module locations, each module location having a corresponding power line configured to provide electrical power to a UWB module positioned at the corresponding module location, and each UWB module being configured to perform UWB distance ranging with a portable device. The system further includes a control module connected to, and configured to control power to, each power line located at each of the module locations, and having a processor and memory configured to perform for each module location of the plurality of module locations: turn on electrical power to the power line associated with module location while turning off electrical power to every other power line associated every other module location of the plurality of module locations; perform communication with a communicating UWB module that is receiving electrical power from the power line associated with the particular module location; and determine a location of the communicating UWB module within the vehicle based on the communication and the module location associated with the power line.

In other features, the control module is further configured to store, for each UWB module of the plurality of UWB modules, a unique network address assigned to the UWB module along with the determined location of the UWB module.

In other features, the control module is further configured to: instruct each UWB module of the plurality of UWB modules to perform distance ranging with the portable device; receive a set of distance measurements from the plurality of UWB modules, the set of distance measurements indicating distances from each of the UWB modules of the plurality of UWB modules to the portable device; and determine a location of the portable device relative to the vehicle based on the set of distance measurements and the determined locations of the UWB modules within the vehicle.

In other features, the control module is further configured to authorize at least one vehicle function of the vehicle based on the determined location of the portable device relative to the vehicle, the at least one vehicle function including at least one of unlocking the vehicle, opening a trunk of the vehicle, and starting the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosures provides systems and methods for automatically locating ultra-wide band (UWB) modules positioned in a vehicle without requiring the use of physical differences, such as different physical connectors and pin arrangement, to differentiate between UWB modules associated with different locations in an around the vehicle. As such, UWB modules having the same physical characteristics, including same type of connector with the same type of pin arrangements, can be located at different locations in and around the vehicle and the locations of the UWB modules within the vehicle can be automatically detected in accordance with the present disclosure. As described in further detail below, the systems and methods of the present disclosure include a control module that automatically detects the locations of the various UWB modules in and around the vehicle. As described in further detail below, the control module can instruct each of the UWB modules to perform ranging between all pairs of UWB modules within and around the vehicle and can then determine the unique location of each UWB module within and around the vehicle based on the set of distance measurements between all pairs of UWB modules within and around the vehicle. Additionally or alternatively, the control module can include power terminals associated with UWB modules at known locations within and around the vehicle. The control module can then individually provide power to each of the power terminals one at a time and determine the location of each UWB module by observing which UWB module responds after power is provided to the associated power terminal. In this way, multiple UWB modules that are physically identical, and that share the same part number, can be installed in a single vehicle, with their locations being automatically detected by the control module in accordance with the systems and methods of the present disclosure.

Figure 1:
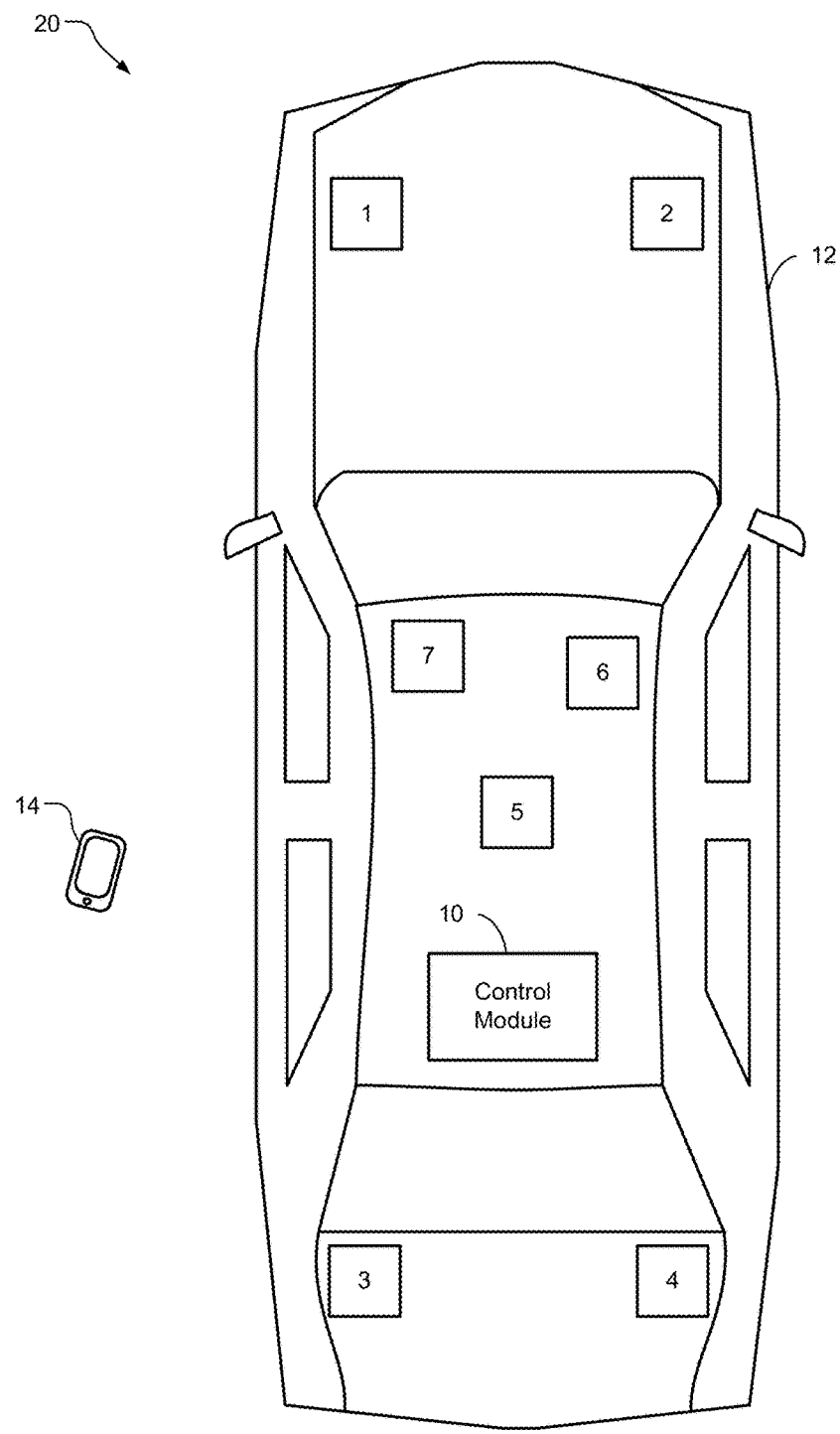
FIG. 1 is a functional block diagram of a system for automatically locating UWB modules in a vehicle according to the present disclosure.

With reference to FIG. 1, a system 20 for automatically locating UWB modules 1-7 positioned in a vehicle 12 is shown and includes a control module 10. The control module 10 may be part of, or be in communication with, a passive entry/passive start (PEPS) system. For example, the UWB modules 1-7 can perform distance ranging with a portable device 14, such as a smartphone or key fob, associated with the vehicle 12 and report the measured distances to the control module 10. The control module 10 can then determine the location of the portable device 14 relative to the vehicle 12 based on the measured distances and the known locations of the UWB modules 1-7 within and around the vehicle 12. Based on the location of the portable device 14 relative to the vehicle 12, the control module 10, and/or a module of a PEPS system that is in communication with the control module 10, can authorize certain vehicle functions, such as unlocking the vehicle, opening a trunk of the vehicle, starting the vehicle, etc.

Figure 2:
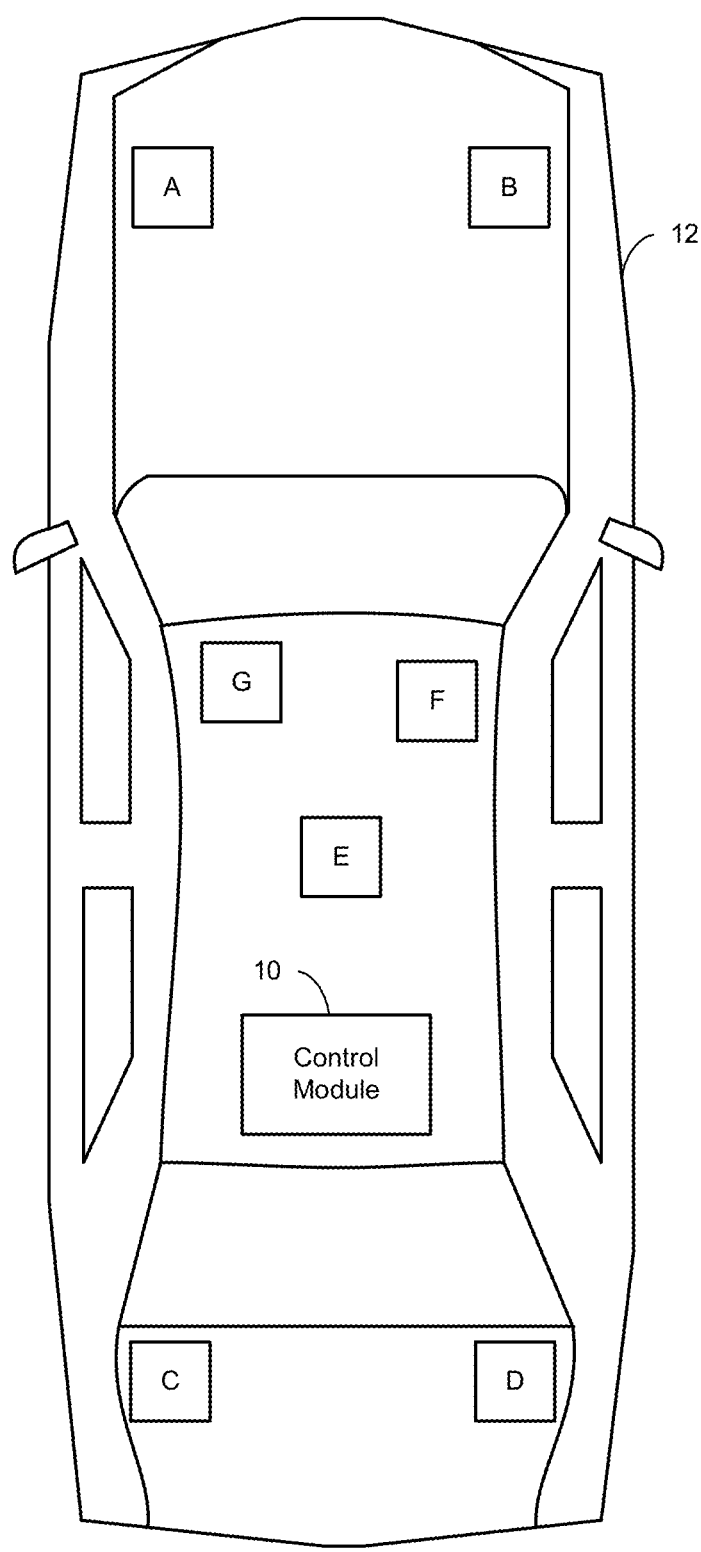
FIG. 2 is a functional block diagram showing installation locations for UWB modules in a vehicle according to the present disclosure.

The UWB modules 1-7 are installed at known relative locations within and around the vehicle 12. With reference to FIG. 2, for example, the vehicle 12 may include designated installation locations A-G for UWB modules 1-7. The installation locations A-G can each include installation hardware, such as brackets, to receive the UWB modules 1-7. The installation locations A-G can each also include a communication connection to a communication bus within the vehicle to enable communication between the UWB modules 1-7 and the control module 10. The installation locations A-G can each also include a power line and power connector that provides electrical power to the UWB modules 1-7, as discussed in further detail below. The relative positions of the installation locations A-G are predetermined and known prior to installation of the UWB modules 1-7. In addition, as discussed in further detail below, the distances between each of the installation locations A-G are predetermined and known prior to installation of the UWB modules 1-7 during the design phase of the vehicle.

The UWB modules 1-7 are connected to, and in communication with, the control module 10 via a suitable communication bus. Each of the UWB modules 1-7 includes a processing module and/or a communication module configured to communicate with the control module 10 via the communication bus. The communication bus can be a wired communication bus, such as a controller area network (CAN) bus or a local interconnect network (LIN) bus, although any other suitable communication bus or protocol can be used to provide communication between the UWB modules 1-7 and the control module 10. Each of the installation locations A-G for the UWB modules 1-7 can be equipped with a suitable communication connector/interface to allow the UWB modules 1-7 to connect to, and communicate over, the communication bus to communicate with the control module 10. Alternatively, the UWB modules 1-7 can be configured to communicate wirelessly with the control module 10. For example, the UWB modules 1-7 can be configured to communicate with the control module 10 using UWB and/or via Bluetooth, Bluetooth Low Energy (BLE), and/or near-field communication (NFC) communication protocols, although any suitable wireless communication protocol can be used.

As noted above the UWB modules 1-7 are physically indistinct and can each have the same type of connector, with the same type of pin configuration, and the same part number. While physically indistinct, each of the UWB modules 1-7 can have an associated unique identifier number, such as a serial number that uniquely identifies that particular UWB module. For example, the UWB module can include a storage module, such as a non-transitory memory, that stores the unique identifier associated with that particular UWB module for the life of the UWB module. Each of the UWB modules 1-7 includes a UWB sensor and a processing module and/or communication module configured to perform UWB distance ranging with another UWB enabled communication device. As noted above each of the UWB modules 1-7 can perform distance ranging with a UWB enabled portable device 14, such as a smart phone or a keyfob. Additionally, each of the UWB modules 1-7 can perform distance ranging with each other.

Figure 3:
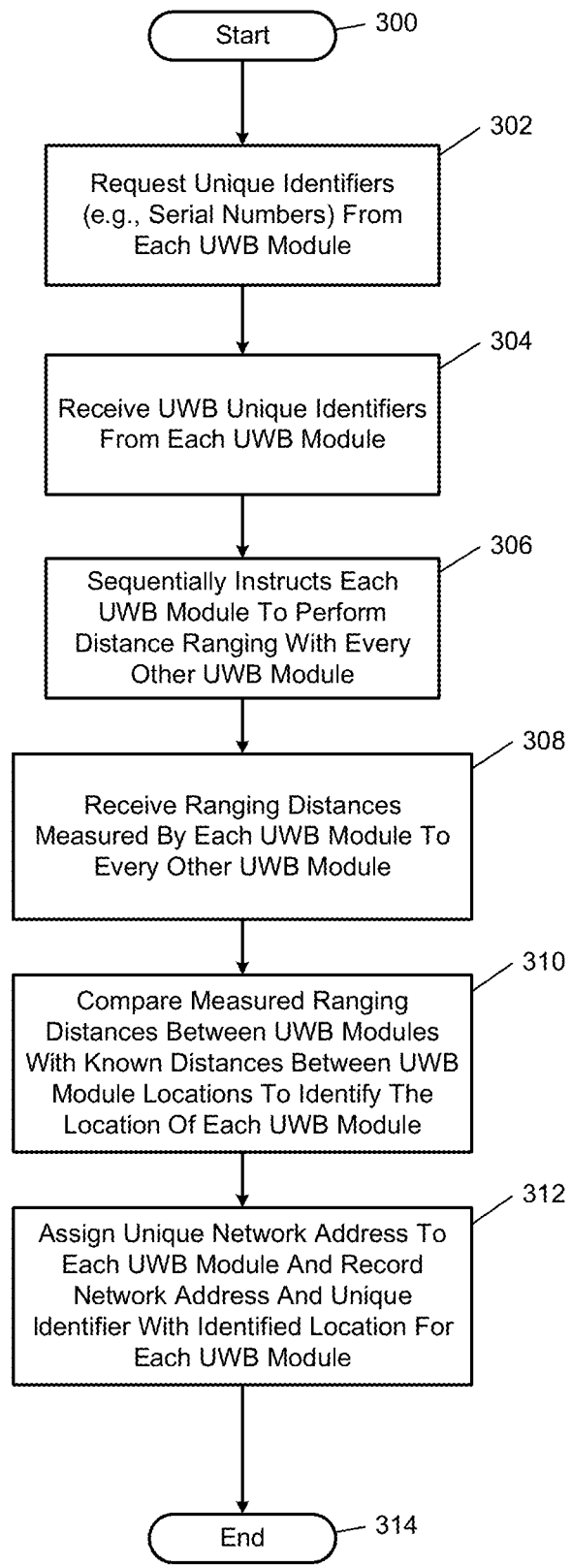
FIG. 3 is a flow diagram for a process of automatically locating UWB modules in a vehicle according to the present disclosure.

With reference to FIG. 3, a flow diagram for a process of automatically locating UWB modules 1-7 within and around the vehicle 12 according to the present disclosure is shown. The process can be performed by the control module 10 after the UWB modules 1-7 have been installed in the vehicle 12 at the various installation locations and have been configured for communication with the control module 10. The process starts at 300. At 302, the control module 10 requests the unique identifiers, such as the serial numbers, from each of the UWB modules 1-7. In response, each of the UWB modules 1-7 sends its unique identifier to the control module. At 304, control module 10 receives the unique identifiers from the UWB modules 1-7.

Figure 4:
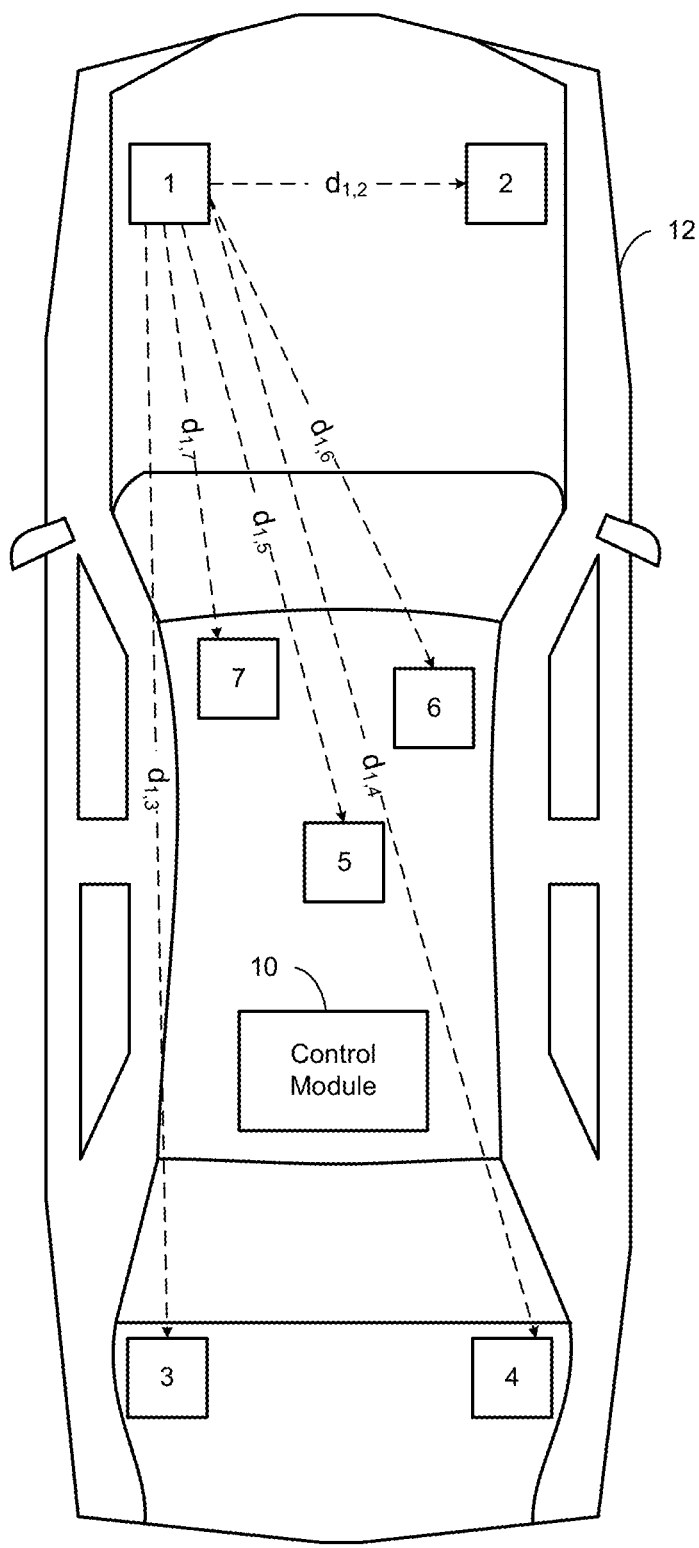
FIG. 4 is another functional block diagram of a system for automatically locating UWB modules in a vehicle according to the present disclosure.
Figure 5:
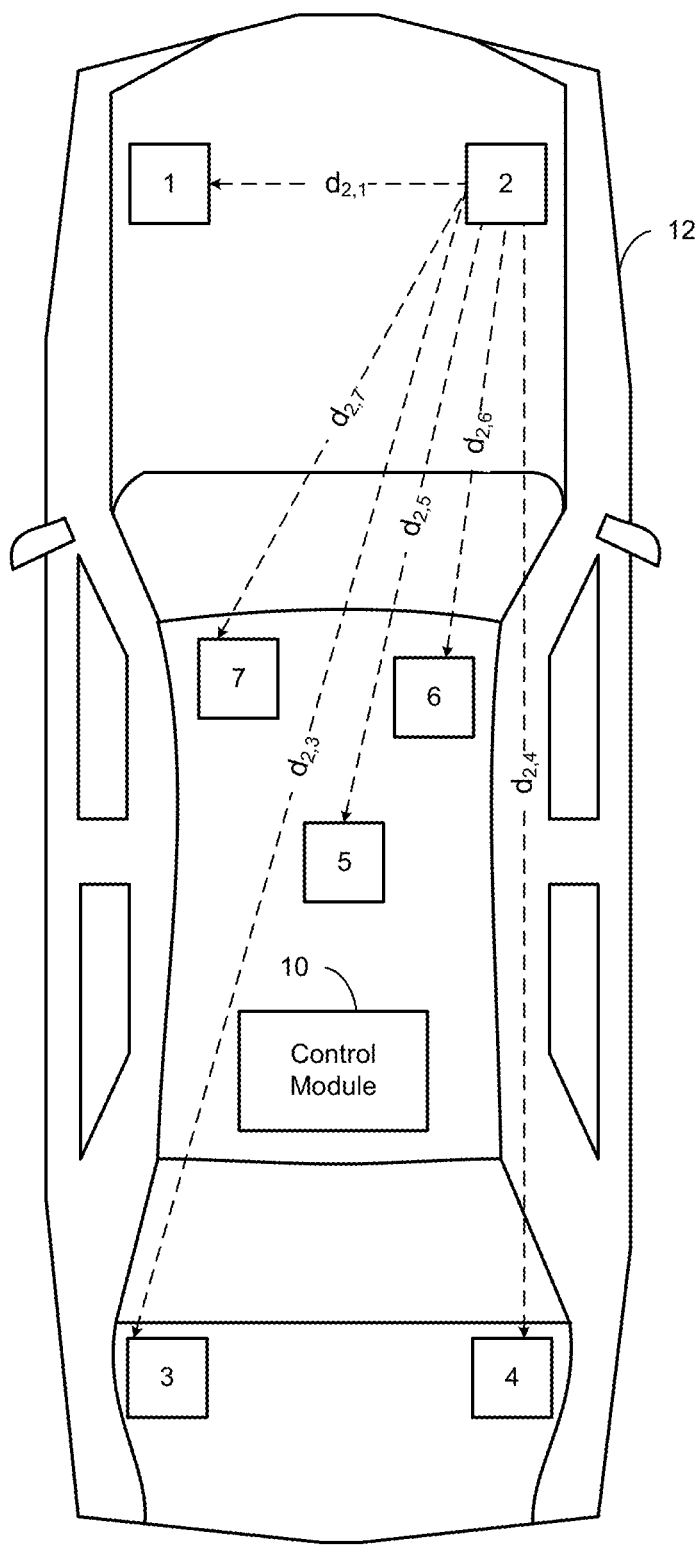
FIG. 5 is another functional block diagram of a system for automatically locating UWB modules in a vehicle according to the present disclosure.

At 306, the control module 10 individually and sequentially instructs each UWB module 1-7 to perform distance ranging with every other UWB module 1-7 within the system 20. For example, the control module 10 can instruct UWB module 1 to perform distance ranging with UWB modules 2-7. The control module 10 can then instruct UWB module 2 to perform distance ranging with UWB modules 1 and 3-7, and so on. In this way, each of the UWB modules 1-7 is instructed to perform distance ranging with every other UWB module 1—within and around the vehicle 12 and within the system 20. With reference to FIG. 4, distance ranging measurements between UWB module 1 and each of UWB modules 2-7 are illustrated. For example, the distance measurement resulting from UWB module 1 performing distance ranging with UWB module 2 is represented as $d_{1,2}$, and the distance measurement resulting from UWB module 1 performing distance ranging with UWB module 3 is represented as $d_{1,3}$, and so on. Similarly, with reference to FIG. 5, distance ranging measurements between UWB module 2 and each of UWB modules 1 and 3-7 are illustrated. For example, the distance measurement resulting from UWB module 2 performing distance ranging with UWB module 1 is represented as $d_{2,1}$, and the distance measurement resulting from UWB module 2 performing distance ranging with UWB module 3 is represented as $d_{2,3}$ and so on.

Returning to FIG. 3, at 308 the control module 10 receives the ranging distances measured by each UWB module 1-7 to every other UWB module 1-7 within the system 20. In other words, the control module 10 receives and stores a set of measurements from each UWB module 1-7, with each set of measurements including a distancing ranging measurement from the particular UWB module to every other UWB module 1-7 within the system 20. For example, the control module 10 receives the distance measurements represented in Table 1 below, with the distance "$d_{x,y}$" representing the distance measured by UWB module X to UWB module Y using UWB distance ranging. The control module 10 includes non-transitory memory to store the measurements, such as the measurements shown in Table 1 below.

TABLE 1

Measured distances between UWB modules 1-7

| Modules→ ↓ | 1 | 2 | 3 | 4 | 5 | 6 | 7 |
|---|---|---|---|---|---|---|---|
| 1 | — | $d_{1,2}$ | $d_{1,3}$ | $d_{1,4}$ | $d_{i,5}$ | $d_{i,6}$ | $d_{i,7}$ |
| 2 | $d_{2,1}$ | — | $d_{2,3}$ | $d_{2,4}$ | $d_{2,5}$ | $d_{2,6}$ | $d_{2,6}$ |
| 3 | $d_{3,1}$ | $d_{3,2}$ | — | $d_{3,4}$ | $d_{3,5}$ | $d_{3,6}$ | $d_{3,7}$ |
| 4 | $d_{4,1}$ | $d_{4,2}$ | $d_{4,3}$ | — | $d_{4,5}$ | $d_{4,6}$ | $d_{4,7}$ |
| 5 | $d_{5,1}$ | $d_{5,2}$ | $d_{5,3}$ | $d_{5,4}$ | — | $d_{5,6}$ | $d_{5,7}$ |
| 6 | $d_{6,1}$ | $d_{6,2}$ | $d_{6,3}$ | $d_{6,4}$ | $d_{6,5}$ | — | $d_{6,7}$ |
| 7 | $d_{7,1}$ | $d_{7,2}$ | $d_{7,3}$ | $d_{7,4}$ | $d_{7,5}$ | $d_{7,6}$ | — |

TABLE 1-continued

At 310, the control module 10 compares the measured distances between UWB modules 1-7 with the known distances between each of the UWB module installation locations A-G to determine and identify the location of each UWB module 1-7 within and around the vehicle 12. For example, the control module 10 stores the known distances between each of the UWB module installation locations A-G represented in Table 2 below, with the distance "$D_{x,y}$" representing the known distance between the installation location X and installation location Y. The distance $D_{X,Y}$ is equivalent to the distance $D_{Y,X}$, and is listed in Table 2 at both locations, i.e., in the rows/columns associated with both installation locations. The control module 10 includes non-transitory memory to store the known distances between the installation locations shown in Table 2 below.

TABLE 2

Known distances between installation location A-G

| Locations→ ↓ | A | B | C | D | E | F | G |
|---|---|---|---|---|---|---|---|
| A | — | $D_{A,B}$ | $D_{A,C}$ | $D_{A,D}$ | $D_{A,E}$ | $D_{A,F}$ | $D_{A,G}$ |
| B | $D_{B,A}$ | — | $D_{B,C}$ | $D_{B,D}$ | $D_{B,E}$ | $D_{B,F}$ | $D_{B,G}$ |
| C | $D_{C,A}$ | $D_{C,B}$ | — | $D_{C,D}$ | $D_{C,E}$ | $D_{C,F}$ | $D_{C,G}$ |
| D | $D_{D,A}$ | $D_{D,B}$ | $D_{D,C}$ | — | $D_{D,E}$ | $D_{D,F}$ | $D_{D,G}$ |
| E | $D_{E,A}$ | $D_{E,B}$ | $D_{E,C}$ | $D_{E,D}$ | — | $D_{E,F}$ | $D_{E,G}$ |
| F | $D_{F,A}$ | $D_{F,B}$ | $D_{F,C}$ | $D_{F,D}$ | $D_{F,E}$ | — | $D_{F,G}$ |
| G | $D_{G,A}$ | $D_{G,B}$ | $D_{G,C}$ | $D_{G,D}$ | $D_{G,E}$ | $D_{G,F}$ | — |

The control module 10 compares and correlates the sets of distances measured by the UWB modules 1-7, as shown in Table 1, with the sets of known distances between the UWB module installation locations A-G, as shown in Table 2, to determine the locations of the UWB modules 1-7 within and around the vehicle. The known distances between the UWB module installation locations A-G are configured such that the set of distances is unique for each of the UWB module installation locations A-G. In other words, in the above example, the set of five distances associated with installation location A is unique to installation location A. Put another way, none of the other installation locations B-G have the same set of five associated distances as installation location A. As such, once the control module 10 matches a set of distances measured by one of the UWB modules 1-7 with a particular set of known distances between the installation locations A-G, the control module 10 determines that the particular UWB module is located at the associated installation location.

For example, if the control module 10 determines that the set of distances measured by UWB module 1 to the other UWB modules 2-7, i.e., $\{d_{1,2}, d_{1,3}, d_{1,4}, d_{1,5}, d_{1,6}, d_{1,7}\}$ matches the set of known distances to other installation locations associated with location A, i.e., $\{D_{A,B}, D_{A,C}, D_{A,D}, D_{A,E}, D_{A,F}, D_{A,G}\}$, then the control module 10 can determine and identify that UWB module 1 is located at installation location A on the vehicle. As shown in FIG. 2, installation location A is located on the front driver side of the vehicle 12. The UWB modules 1-7 can have a known accuracy tolerance. For example, the distances measured by the UWB modules 1-7 can be accurate to within ten to twenty centimeters, although UWB modules having other accuracy tolerances can be used in accordance with the present teachings. The control module 10 performs the comparisons between the measured and known distances, while accounting for the known accuracy tolerance of the of the UWB modules 1-7.

The control module 10 continues until it has matched each of the UWB modules 1-7 with a corresponding one of the installation locations A-G. Once all of the UWB modules 1-7 have been matched with a corresponding one of the installation locations A-G, the control module proceeds to 312.

At 312, the control module 10 assigned a unique network address to each UWB module 1-7 and records the assigned unique network address with the identified location for each UWB module in memory. As such, at 312 the control module 10 generates and stores the information shown below in Table 3, wherein UIDx represents the unique identification number associated with UWB module X and UNAx represents the unique network address associated with UWB module X.

TABLE 3

| Module | Location | UID | UNA |
|---|---|---|---|
| 1 | A | $UID_1$ | $UNA_1$ |
| 2 | B | $UID_2$ | $UNA_2$ |
| 3 | C | $UID_3$ | $UNA_3$ |
| 4 | D | $UID_4$ | $UNA_4$ |
| 5 | E | $UID_5$ | $UNA_5$ |
| 6 | F | $UID_6$ | $UNA_6$ |
| 7 | G | $UID_7$ | $UNA_7$ |

At this point, the control module 10 has identified the locations of all UWB modules 1-7 within and around the vehicle and assigned each of the UWB modules 1-7 a unique network address for use in communication over the communication bus. The control module 10 can now proceed with utilizing the UWB modules 1-7 to perform ranging with a portable device 14 and determine the location of the portable device 14 relative to the vehicle. Based on the location of the portable device 14 relative to the vehicle 12, the control module 10, and/or a module of a PEPS system that is in communication with the control module 10, can authorize certain vehicle functions, such as unlocking the vehicle, opening a trunk of the vehicle, starting the vehicle, etc.

The process ends at 314.

The process shown in FIG. 3 can be performed by the control module 10 at the time the UWB modules 1-7 are installed within and around the vehicle 12 during the manufacture of the vehicle 12. The process shown in FIG. 3 can also be performed by the control module 10 after a repair procedure on the vehicle 12 that involves repairing or replacing any of the UWB modules 1-7.

In this way, the process shown in FIG. 3, and discussed above with reference to FIGS. 1-5 can be used to automatically locate the positions of UWB modules 1-7 in the vehicle 12 without having to utilize physical differences between the UWB modules 1-7, such as connector keying using different connector pin configurations, for UWB modules positioned at different installation locations within and around the vehicle.

Figure 6:
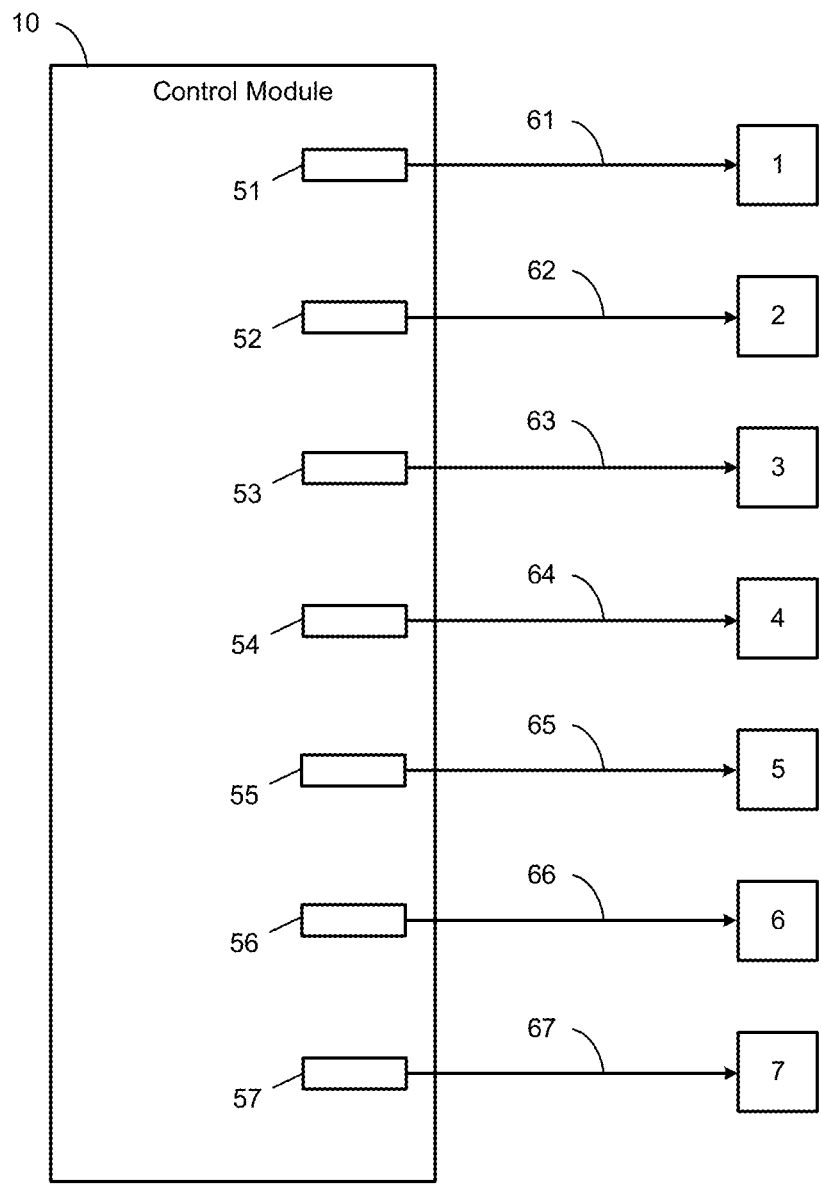
FIG. 6 is a functional block diagram of another system for automatically locating UWB modules in a vehicle according to the present disclosure.
Figure 7:
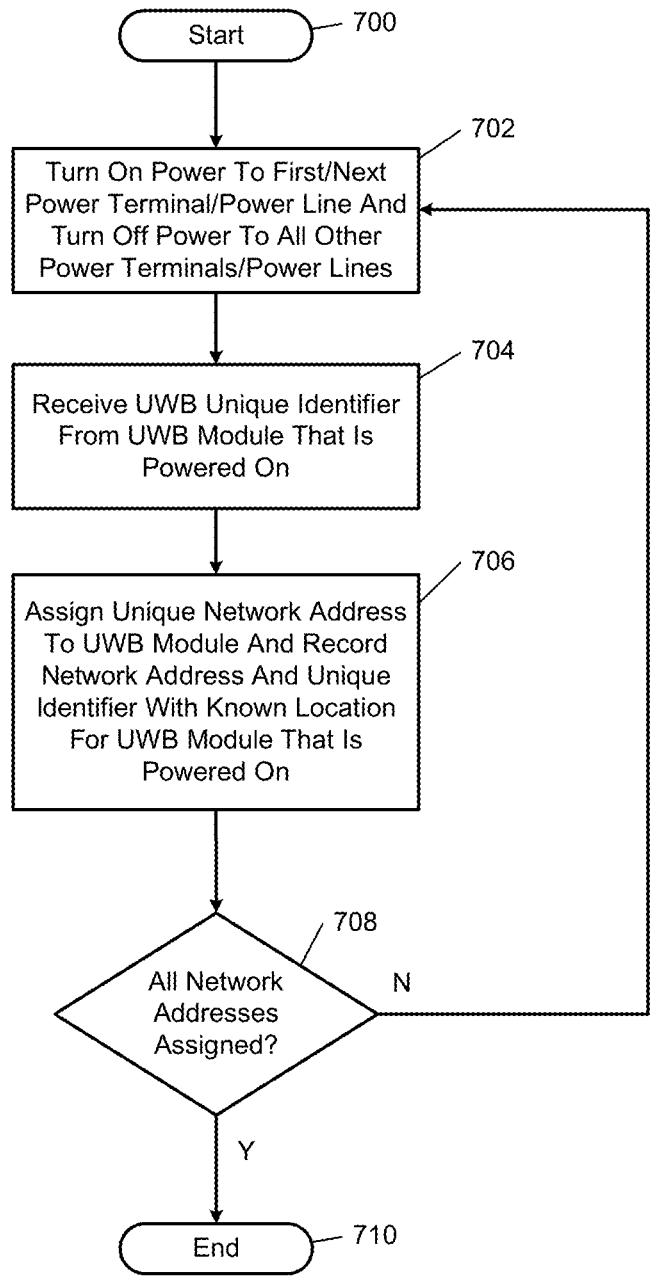
FIG. 7 is a flow diagram for another process of automatically locating UWB modules in a vehicle according to the present disclosure.

With reference to FIGS. 6 and 7, an additional system and an additional method for automatically locating UWB modules 1-7 in a vehicle 12 are shown. In the embodiment shown in FIGS. 6 and 7, the control module 10 sequentially turns the power on to each of the UWB modules 1-7 and observes which UWB module responds. Because the individual power terminals controlled by the control module 10 for each UWB module are associated with known installation locations for the UWB modules 1-7, the control module 10 can then determine the installation location for each of the UWB modules 1-7.

With reference to FIG. 6, the control module 10 is shown having power terminals 51-57 that are connected to power lines 61-67 and UWB modules 1-7, respectively. In this embodiment, the control module 10, the power terminals 51-57, and the power lines 61-67 are configured such that each of the power terminals 51-57 and each of the power lines 61-67 are associated with a predetermined one of the installation locations A-G. For example, at the time of manufacture of the vehicle 12, the control module 10, the power terminals 51-57, and the power lines 61-67 can be configured such that power terminal 51 is associated with power line 61, which provides electrical power to a UWB module located at installation location A. Similarly, power terminal 52 and power line 62 can provide power to a UWB module located at installation location B, and so on. The installation locations A-G associated with each of the power lines 61-67 and each of the power terminals 51-57 of the control module 10 are known and determined at the time of design/manufacture of the vehicle.

With reference to FIG. 7, a flow diagram for a process of automatically locating UWB modules 1-7 in a vehicle 12, utilizing the power terminals 51-57 and power lines 61-67, according to the present disclosure is shown. The process can be performed by the control module 10 after the UWB modules 1-7 have been installed in the vehicle 12 at the various installation locations and have been connected to associated power lines 61-67 and power terminals 51-57 and configured for communication with the control module 10. The process starts at 700. At 702, the control module selects a first power terminal/power line to turn on and turns off all remaining power terminals/power lines. For example, the control module 10 can turn on power to power terminal 51 to provide power to power line 61 and can turn off power to power terminals 52-57 to turn off power to power lines 62-67. The control module 10 may store information indicating that power terminal 51 and power line 61 are associated with installation location A within the vehicle 12.

Since only one UWB module is turned on at this point, only one UWB module can communicate with the control module 10. At 704, the control module 10 receive the unique identifier for the only UWB module that is currently turned on. For example, at 704 UWB module 1 may respond to the control module 10 and provide its unique identifier to the control module 10. At 706, the control module 10 assigns a unique network address to the UWB module 1 and records information indicating the unique network address and unique identifier of UWB module 1 and indicating that UWB module 1 is located at installation location A. The control module 10 then proceeds to 708.

At 708, the control module 10 determines whether all network address have been assigned. For example, the control module 10 may have seven network addresses to assign for seven unique UWB modules 1-7. At 708, when all seven network addresses have not yet been assigned, the control module 10 loops back to 702 and turns power on to the next power terminal and power line. For example, in the second pass the control module 10 may turn on power to power terminal 52 to provide power to power line 62. The control module 10 may store information indicating that power terminal 52 and power line 62 are associated with installation location B. The control module 10 may also turn off power to the remaining power terminals 51 and 53-57 and the remaining associated power lines 61 and 63-67. The control module 10 continues operating in this fashion until all network addresses have been assigned.

At 708, when all network addresses have been assigned, the control module 10 proceeds to 710 and the process ends.

At this point, the control module 10 will have assigned a unique network address to each UWB module 1-7 and records the assigned unique network address with the identified location for each UWB module in memory. As such, the control module 10 generates and stores the information shown below in Table 4, wherein UIDx represents the unique identification number associated with UWB module X and UNAx represents the unique network address associated with UWB module X

TABLE 4

| Module | Location | UID | UNA |
|---|---|---|---|
| 1 | A | $UID_1$ | $UNA_1$ |
| 2 | B | $UID_2$ | $UNA_2$ |
| 3 | C | $UID_3$ | $UNA_3$ |
| 4 | D | $UID_4$ | $UNA_4$ |
| 5 | E | $UID_5$ | $UNA_5$ |
| 6 | F | $UID_6$ | $UNA_6$ |
| 7 | G | $UID_7$ | $UNA_7$ |

The process shown in FIG. 7 can be performed by the control module 10 at the time the UWB modules 1-7 are installed within and around the vehicle 12 during the manufacture of the vehicle 12. The process shown in FIG. 7 can also be performed by the control module 10 after a repair procedure on the vehicle 12 that involves repairing or replacing any of the UWB modules 1-7.

In this way, the process shown in FIG. 7 and discussed above can be used to automatically locate the positions of UWB modules 1-7 in the vehicle 12 without having to utilize physical differences between the UWB modules 1-7, such as connector keying using different connector pin configurations, for UWB modules positioned at different installation locations within and around the vehicle.

A described above, a system is provided and includes a plurality of ultra-wide band (UWB) modules located within a vehicle having a plurality of module locations, the plurality of module locations being located at known distances relative to each other, each UWB module being configured to perform UWB distance ranging with a portable device and with every other UWB module of the plurality of UWB modules. The system also includes a control module in communication with the plurality of UWB modules and having a processor and memory configured to: store the known distances of the plurality of module locations relative to each other; instruct each UWB module of the plurality of UWB modules to perform distance ranging with every other UWB module of the plurality of UWB modules; receive a set of measurements associated with each UWB module of the plurality of UWB modules, the set of measurements including distances measured by the associated UWB module to every other UWB module of the plurality of UWB modules; perform a comparison of the set of measurements associated with each UWB module with the known distances of the plurality of UWB modules relative to each other; and determine a location within the vehicle of each UWB module of the plurality of UWB modules based on the comparison, the location for each UWB module being one of the plurality of module locations.

In other features, the control module is further configured to assign a unique network address to each UWB module of the plurality of UWB modules.

In other features, the control module is further configured to store, for each UWB module of the plurality of UWB modules, the determined location of the UWB module along with the unique network address assigned to the UWB module.

In other features, each UWB module includes a unique identifier and the control module is further configured to store, for each UWB module of the plurality of UWB modules, the unique identifier of the UWB module along with the determined location and unique network address assigned to the UWB module.

In other features, the control module is further configured to: instruct each UWB module of the plurality of UWB modules to perform distance ranging with the portable device; receive a set of distance measurements from the plurality of UWB modules, the set of distance measurements indicating distances from each UWB module of the plurality of UWB modules to the portable device; and determine a location of the portable device relative to the vehicle based on the set of distance measurements and based on the determined location of each UWB module within the vehicle.

In other features, the control module is further configured to authorize at least one vehicle function of the vehicle based on the determined location of the portable device relative to the vehicle, the at least one vehicle function including at least one of unlocking the vehicle, opening a trunk of the vehicle, and starting the vehicle.

In other features, the control module is in communication with a passive entry passive start system configured to authorize at least one vehicle function of the vehicle based on the determined location of the portable device relative to the vehicle, the at least one vehicle function including at least one of unlocking the vehicle, opening a trunk of the vehicle, and starting the vehicle.

In other features, the control module is configured to communicate with each UWB module of the plurality of UWB modules via at least one wired bus communication connection.

As described above, a method of locating a plurality of ultra-wide band (UWB) modules located within a vehicle having a plurality of module locations is also provided. The plurality of module locations are located at known distances relative to each other, and each UWB module is configured to perform UWB distance ranging with a portable device and with every other UWB module of the plurality of UWB modules. The method includes: storing, with a control module, the known distances of the plurality module locations relative to each other; instructing, with the control module, each UWB module of the plurality of UWB modules to perform distance ranging with every other UWB module of the plurality of UWB modules; receiving, with the control module, a set of measurements associated with each UWB module of the plurality of UWB modules, the set of measurements including distances measured by the associated USB module to every other UWB module of the plurality of UWB modules; performing, with the control module, a comparison of the set of measurements associated with each UWB module with the known distances of the plurality of UWB modules relative to each other; and determining, with the control module, a location within the vehicle of each UWB module of the plurality of UWB modules based on the comparison, the location for each UWB module being one of the plurality of module locations.

In other features, the method further includes assigning, with the control module, a unique network address to each UWB module of the plurality of UWB modules.

In other features, the method further includes storing, with the control module and for each UWB module of the plurality of UWB modules, the determined location of the UWB module along with the unique network address assigned to the UWB module.

In other features, each UWB module includes a unique identifier, the method further comprising storing, for each UWB module of the plurality of UWB modules, the unique identifier of the UWB module along with the determined location and unique network address assigned to the UWB module.

In other features, the method further includes: instructing, with the control module, each UWB module of the plurality of UWB modules to perform distance ranging with the portable device; receiving, with the control module, a set of distance measurements from the plurality of UWB modules, the set of distance measurements indicating distances from each UWB module of the plurality of UWB modules to the portable device; and determining, with the control module, a location of the portable device relative to the vehicle based on the set of distance measurements and based on the determined location of each UWB module within the vehicle.

In other features, the method further includes authorizing, with the control module, at least one vehicle function of the vehicle based on the determined location of the portable device relative to the vehicle, the at least one vehicle function including at least one of unlocking the vehicle, opening a trunk of the vehicle, and starting the vehicle.

In other features, the method further includes communicating, with the control module, the determined location of the portable device to a passive entry passive start system configured to authorize at least one vehicle function of the vehicle based on the determined location of the portable device relative to the vehicle, the at least one vehicle function including at least one of unlocking the vehicle, opening a trunk of the vehicle, and starting the vehicle.

In other features, the method further includes communicating, between the control module and each UWB module of the plurality of UWB modules, via at least one wired bus communication connection.

As describes above, another system is also provided and includes a plurality of ultra-wide band (UWB) modules located within a vehicle having a plurality of module locations, each module location having a corresponding power line configured to provide electrical power to a UWB module positioned at the corresponding module location, and each UWB module being configured to perform UWB distance ranging with a portable device. The system further includes a control module connected to, and configured to control power to, each power line located at each of the module locations, and having a processor and memory configured to perform for each module location of the plurality of module locations: turn on electrical power to the power line associated with module location while turning off electrical power to every other power line associated every other module location of the plurality of module locations; perform communication with a communicating UWB module that is receiving electrical power from the power line associated with the particular module location; and determine a location of the communicating UWB module within the vehicle based on the communication and the module location associated with the power line.

In other features, the control module is further configured to store, for each UWB module of the plurality of UWB modules, a unique network address assigned to the UWB module along with the determined location of the UWB module.

In other features, the control module is further configured to: instruct each UWB module of the plurality of UWB modules to perform distance ranging with the portable device; receive a set of distance measurements from the plurality of UWB modules, the set of distance measurements indicating distances from each of the UWB modules of the plurality of UWB modules to the portable device; and determine a location of the portable device relative to the vehicle based on the set of distance measurements and the determined locations of the UWB modules within the vehicle.

In other features, the control module is further configured to authorize at least one vehicle function of the vehicle based on the determined location of the portable device relative to the vehicle, the at least one vehicle function including at least one of unlocking the vehicle, opening a trunk of the vehicle, and starting the vehicle.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

As used herein, the phrase at least one of A, B, and C should be construed to mean a logical (A OR B OR C), using a non-exclusive logical OR. For example, the phrase at least one of A, B, and C should be construed to include any one of: (i) A alone; (ii) B alone; (iii) C alone; (iv) A and B together; (v) A and C together; (vi) B and C together; (vii) A, B, and C together. The phrase at least one of A, B, and C should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance.

It is also to be understood that additional or alternative steps may be employed.

What is claimed is:

1. A system comprising:
a plurality of ultra-wide band (UWB) modules located within a vehicle having a plurality of module locations, the plurality of module locations being located at known distances relative to each other, each UWB module being configured to perform UWB distance ranging with a portable device and with every other UWB module of the plurality of UWB modules;
a control module in communication with the plurality of UWB modules and having a processor and memory configured to:
store the known distances of the plurality of module locations relative to each other;
instruct each UWB module of the plurality of UWB modules to perform distance ranging with every other UWB module of the plurality of UWB modules;
receive a set of measurements associated with each UWB module of the plurality of UWB modules, the set of measurements including distances measured by the associated UWB module to every other UWB module of the plurality of UWB modules;
perform a comparison of the set of measurements associated with each UWB module with the known distances of the plurality of UWB modules relative to each other;
determine a location within the vehicle of each UWB module of the plurality of UWB modules based on the comparison, the location for each UWB module being one of the plurality of module locations; and
assign a unique network address to each UWB module of the plurality of UWB modules.

2. The system recited by claim 1, wherein the control module is further configured to store, for each UWB module of the plurality of UWB modules, the determined location of the UWB module along with the unique network address assigned to the UWB module.

3. The system recited by claim 2, wherein each UWB module includes a unique identifier and the control module is further configured to store, for each UWB module of the plurality of UWB modules, the unique identifier of the UWB module along with the determined location and unique network address assigned to the UWB module.

4. The system recited by claim 1, wherein the control module is further configured to:
instruct each UWB module of the plurality of UWB modules to perform distance ranging with the portable device;
receive a set of distance measurements from the plurality of UWB modules, the set of distance measurements indicating distances from each UWB module of the plurality of UWB modules to the portable device; and
determine a location of the portable device relative to the vehicle based on the set of distance measurements and based on the determined location of each UWB module within the vehicle.

5. The system recited by claim 4, wherein the control module is further configured to authorize at least one vehicle function of the vehicle based on the determined location of the portable device relative to the vehicle, the at least one vehicle function including at least one of unlocking the vehicle, opening a trunk of the vehicle, and starting the vehicle.

6. The system recited by claim 4, wherein the control module is in communication with a passive entry passive start system configured to authorize at least one vehicle function of the vehicle based on the determined location of the portable device relative to the vehicle, the at least one vehicle function including at least one of unlocking the vehicle, opening a trunk of the vehicle, and starting the vehicle.

7. The system recited by claim 1, wherein the control module is configured to communicate with each UWB module of the plurality of UWB modules via at least one wired bus communication connection.

8. A method of locating a plurality of ultra-wide band (UWB) modules located within a vehicle having a plurality of module locations, the plurality of module locations being located at known distances relative to each other, each UWB module being configured to perform UWB distance ranging with a portable device and with every other UWB module of the plurality of UWB modules, the method comprising:
storing, with a control module, the known distances of the plurality module locations relative to each other;
instructing, with the control module, each UWB module of the plurality of UWB modules to perform distance ranging with every other UWB module of the plurality of UWB modules;
receiving, with the control module, a set of measurements associated with each UWB module of the plurality of UWB modules, the set of measurements including distances measured by the associated USB module to every other UWB module of the plurality of UWB modules;
performing, with the control module, a comparison of the set of measurements associated with each UWB module with the known distances of the plurality of UWB modules relative to each other;
determining, with the control module, a location within the vehicle of each UWB module of the plurality of UWB modules based on the comparison, the location for each UWB module being one of the plurality of module locations; and
assigning, with the control module, a unique network address to each UWB module of the plurality of UWB modules.

9. The method recited by claim 8, further comprising storing, with the control module and for each UWB module of the plurality of UWB modules, the determined location of the UWB module along with the unique network address assigned to the UWB module.

10. The method recited by claim 9, wherein each UWB module includes a unique identifier, the method further comprising storing, for each UWB module of the plurality of UWB modules, the unique identifier of the UWB module along with the determined location and unique network address assigned to the UWB module.

11. The method recited by claim 8, further comprising:
instructing, with the control module, each UWB module of the plurality of UWB modules to perform distance ranging with the portable device;
receiving, with the control module, a set of distance measurements from the plurality of UWB modules, the set of distance measurements indicating distances from each UWB module of the plurality of UWB modules to the portable device; and
determining, with the control module, a location of the portable device relative to the vehicle based on the set of distance measurements and based on the determined location of each UWB module within the vehicle.

12. The method recited by claim 11, further comprising authorizing, with the control module, at least one vehicle function of the vehicle based on the determined location of the portable device relative to the vehicle, the at least one vehicle function including at least one of unlocking the vehicle, opening a trunk of the vehicle, and starting the vehicle.

13. The method recited by claim 11, further comprising communicating, with the control module, the determined location of the portable device to a passive entry passive start system configured to authorize at least one vehicle function of the vehicle based on the determined location of the portable device relative to the vehicle, the at least one vehicle function including at least one of unlocking the vehicle, opening a trunk of the vehicle, and starting the vehicle.

14. The method recited by claim 8, further comprising communicating, between the control module and each UWB module of the plurality of UWB modules, via at least one wired bus communication connection.

15. A system comprising:
a plurality of ultra-wide band (UWB) modules located within a vehicle having a plurality of module locations, each module location having a corresponding power line configured to provide electrical power to a UWB module positioned at the corresponding module location, and each UWB module being configured to perform UWB distance ranging with a portable device;
a control module connected to, and configured to control power to, each power line located at each of the module locations, and having a processor and memory configured to perform for each module location of the plurality of module locations:
turn on electrical power to the power line associated with module location while turning off electrical power to every other power line associated every other module location of the plurality of module locations;
perform communication with a communicating UWB module that is receiving electrical power from the power line associated with the particular module location; and
determine a location of the communicating UWB module within the vehicle based on the communication and the module location associated with the power line.

16. The system recited by claim 15, wherein the control module is further configured to store, for each UWB module of the plurality of UWB modules, a unique network address assigned to the UWB module along with the determined location of the UWB module.

17. The system recited by claim 15, wherein the control module is further configured to:
instruct each UWB module of the plurality of UWB modules to perform distance ranging with the portable device;
receive a set of distance measurements from the plurality of UWB modules, the set of distance measurements indicating distances from each of the UWB modules of the plurality of UWB modules to the portable device; and
determine a location of the portable device relative to the vehicle based on the set of distance measurements and the determined locations of the UWB modules within the vehicle.

18. The system recited by claim 17, wherein the control module is further configured to authorize at least one vehicle function of the vehicle based on the determined location of the portable device relative to the vehicle, the at least one vehicle function including at least one of unlocking the vehicle, opening a trunk of the vehicle, and starting the vehicle.

* * * * *